(12) United States Patent
Peterson et al.

(10) Patent No.: US 6,956,701 B1
(45) Date of Patent: Oct. 18, 2005

(54) METHOD AND APPARATUS FOR COMBINING LIGHT PATHS OF MULTIPLE COLORED LIGHT SOURCES THROUGH A COMMON INTEGRATION TUNNEL

(75) Inventors: Mark D. Peterson, Lake Oswego, OR (US); T. Scott Engle, Tualatin, OR (US); Jeffrey A. Gohman, Hillsboro, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/832,716

(22) Filed: Apr. 26, 2004

(51) Int. Cl.⁷ .................... G02B 27/10; G02B 5/04; G03B 21/00; G03B 21/26; A61B 1/06

(52) U.S. Cl. .............. 359/618; 359/633; 359/634; 359/833; 359/834; 359/636; 353/29; 353/31; 353/84; 353/94; 362/558; 600/173

(58) Field of Search ..................... 359/618, 625, 359/633, 634, 636, 833, 834, 831; 353/29, 353/31, 69, 84, 94; 600/173; 362/555, 558, 362/560; 385/24, 34, 36, 47

(56) References Cited

U.S. PATENT DOCUMENTS

| | | | | |
|---|---|---|---|---|
| 4,344,671 A | * | 8/1982 | Lang | 359/618 |
| 5,724,163 A | * | 3/1998 | David | 359/15 |
| 5,917,655 A | * | 6/1999 | Lehnen et al. | 359/625 |
| 6,306,082 B1 | * | 10/2001 | Takahashi et al. | 600/173 |
| 6,407,867 B1 | * | 6/2002 | Hildebrandt | 359/629 |
| 6,493,148 B1 | * | 12/2002 | Anikitchev | 359/634 |
| 6,520,648 B2 | | 2/2003 | Stark et al. | |
| 6,545,814 B2 | * | 4/2003 | Bartlett et al. | 359/636 |
| 6,688,747 B2 | | 2/2004 | Wichner et al. | |
| 6,698,892 B2 | | 3/2004 | Peterson | |
| 6,808,269 B2 | * | 10/2004 | Cobb | 353/31 |

OTHER PUBLICATIONS

Harbers, et al., "Performance of High-Power LED Illuminators in Projection Displays," Lumileds Lighting, San Jose, CA, USA, 4 pgs.

\* cited by examiner

Primary Examiner—Loha Ben
(74) Attorney, Agent, or Firm—Schwabe, Williamson & Wyatt, P.C.

(57) ABSTRACT

Embodiments of this invention include a system, method and apparatus for combining light paths of multiple colored light sources through a common integration tunnel.

33 Claims, 4 Drawing Sheets

METHOD AND APPARATUS FOR COMBINING LIGHT PATHS OF MULTIPLE COLORED LIGHT SOURCES THROUGH A COMMON INTEGRATION TUNNEL

FIELD OF THE INVENTION

Disclosed embodiments of the present invention relate to the field of projection systems, and more particularly to the use of multiple colored light sources in such projection systems.

BACKGROUND OF THE INVENTION

Multimedia projection systems have become popular for purposes such as conducting sales demonstrations, business meetings, classroom training, and for use in home theaters. In typical operation, multimedia projection systems receive video signals from a data source and convert the video signals to digital information to control one or more digitally driven light valves. Based on this digital information the light valves may manipulate incident light into image bearing light that represents the video image. High-energy discharge lamps emitting polychromatic light have often been used in prior art projection systems. These prior art projection systems suffer from a number of disadvantages including a short lamp life and reduced brightness after an initial period of usage. Additionally, there is a significant amount of resources directed to dividing the polychromatic light in order to selectively manipulate light of the primary colors.

Recent focus has turned to developing and manufacturing projection systems employing and utilizing the monochromatic light of solid state light sources, which are less affected by the shortcomings of polychromatic light sources. One challenge of using multiple monochromatic light sources in projection systems is to achieve a desired color balance, while being cognizant of the reliability, package dimensions, and cost of the projection systems.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION OF EMBODIMENTS OF THE INVENTION

In the following detailed description reference is made to the accompanying drawings that form a part hereof, wherein like numerals designate like parts throughout, and in which is shown, by way of illustration, specific embodiments in which the invention may be practiced. It is to be understood that other embodiments may be utilized and structural or logical changes may be made without departing from the scope of the embodiments of the present invention. Directions such as up, down, back, and front may be used in the discussion of the drawings. These directions are used to facilitate the discussion and are not intended to restrict the application of embodiments of this invention. Therefore, the following detailed description is not to be taken in a limiting sense and the scope of the embodiments of the present invention are defined by the appended claims and their equivalents.

Figure 1:
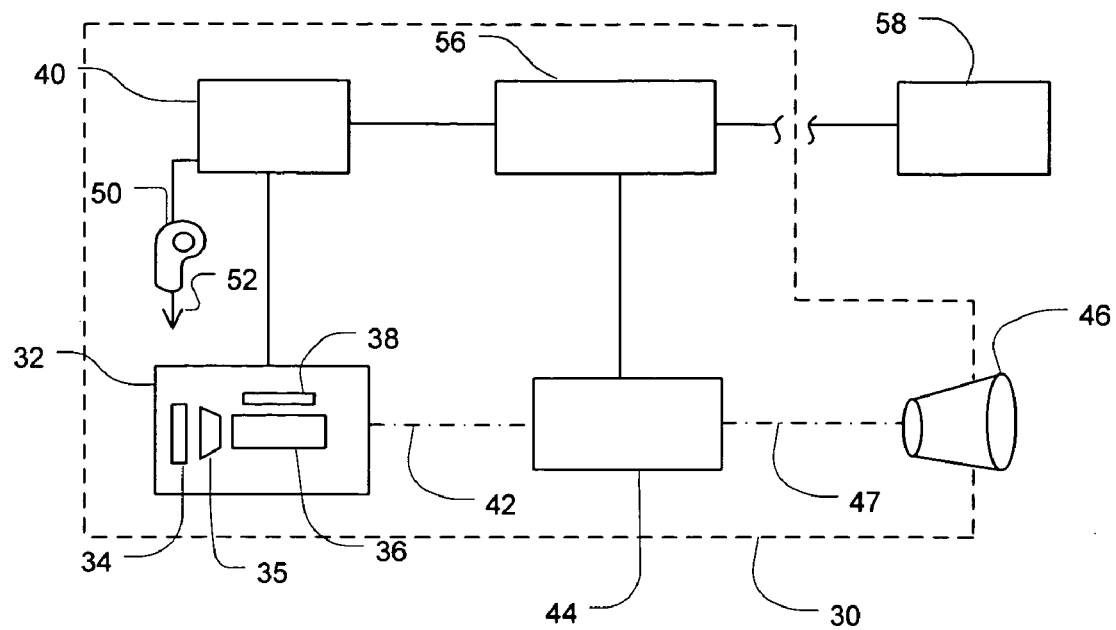
FIG. 1 is a block diagram of a multimedia projection system employing an illumination arrangement in accordance with an embodiment of the present invention.

FIG. 1 is a block diagram of a multimedia projection system 30 employing an illumination arrangement 32, in accordance with an embodiment of the present invention. The illumination arrangement 32, which may be coupled to a power supply 40, may have a number of light sources emitting light of different colors. Like-colored light sources 34 may emit light into an optical assembly 35. The optical assembly 35 may facilitate the presentation of the light from the like-colored light sources 34 into an input aperture of an integrating tunnel 36. The input aperture may include the entire end face of the integrating tunnel, or some smaller portion thereof, to allow light from the light sources 34 to be entered into the integrating tunnel 36. In one embodiment, one or more different colored light sources 38 may introduce light within other ranges of wavelengths into a side of the integrating tunnel 36. This arrangement may allow the flexibility of increasing the intensity of one particular color while using one integrating tunnel to do the primary integration. Increasing the intensity of a particular color may be desirable in order to obtain a more preferred color balance for the projection system 30, discussed further below. Furthermore, this arrangement may also help to reduce the cost and overall dimensions of the projector system 30, compared to having separate integrating tunnels for each color.

In various embodiments, the colored light sources 34 and 38 may comprise solid-state light sources. Examples of solid-state light sources may include, but are not limited to, light-emitting diodes (LEDs), organic LEDs (OLEDs), and laser diodes (e.g., edge emitting diodes and vertical cavity surface emitting laser (VCSEL) diodes).

The integrating tunnel 36 may emit substantially integrated and shaped light along a single light path 42. The single light path 42 may assist in the conservation of the projection system's étendue, or light throughput, by presenting different colored light having similar illumination areas and angles to downstream components.

Light emitted from the illumination arrangement 32 may propagate along the light path 42, illuminate and be modulated by, an imaging device such as a light valve 44, and be transmitted through one or more projection lenses 46. Various optical components may be placed in the light paths to adjust for specific design factors associated with a given embodiment.

The light valve 44 may include, but is not limited to, a digital micromirror device (DMD), a reflective liquid crystal on semiconductor (LCOS) device, and a liquid crystal device (LCD). The projection lens 46 may include, but is not limited to, a fixed focal length lens, a varifocal lens, and a zoom lens.

In one embodiment, the optical components may be held together by an optical frame within a projector housing (not shown). The housing may be mechanically rigid and be designed to facilitate the dissipation of heat. The frame and housing may be adapted to accommodate a cooling fan 50 for cooling the optical components by generating an airflow 52. The power supply 40 may also be used to power the cooling fan 50 and a controller 56.

The controller 56 may receive color image data representing a color image from a data source 58 and process the image data into constituent color data (e.g., red, green, and blue data). The constituent color data may then be conveyed to the light valve 44 in proper synchronism with signals sent to the power supply 40 that control emission time frames of the corresponding constituent colors (e.g., red, green, and blue light). In various embodiments, the controller 56 may include a general-purpose processor/controller, an application specific integrated circuit (ASIC), or a programmable logic device (PLD).

Examples of the data source 58 may include, but are not limited to, a personal or laptop computer, an integrated television tuner, a digital versatile disk (DVD), a set-top box (STB), and a video camera. In one embodiment the projection system 30 may be used as a projector. In other embodiments, the projection system 30 may be used in a projection television.

In an embodiment where the light valve 44 is a DMD, the DMD may include a high-density array of digitally deflected mirrors. The controller 56 may selectively control each of the mirrors such that the light propagating along the light path 42 may be reflected by a given mirror in the array either along a light path 47 toward the projection lens 46 in the form of image bearing light, or toward an adjacent light-absorbing surface, in the form of non-image bearing light. The image bearing light may propagate through the projection lens 46 for display on a screen or surface.

In one embodiment the DMD may be a spatial light modulator composed of a rectangular array of aluminum micromechanical mirrors, each of which can be individually deflected about a hinged axis. In one embodiment, the deflection angle (either positive or negative) of the mirrors may be approximately 10 degrees or more, and be individually controlled by changing the memory contents of underlying addressing circuitry and mirror reset signals.

In an embodiment where the light valve 44 is a transmissive liquid crystal display (LCD), the light path 42 could propagate through it and towards the projection lens 46 without any redirection. In this embodiment the light from the illumination arrangement 32 may first be polarized by a front polarizer. The polarized light may then be modulated by an informational pattern of liquid crystal pixels in the LCD. The "ON" pixels may transmit the polarized light in a selected pass orientation so that the light may pass through a back polarizer (or analyzer) and out along the light path 47 as image bearing light. The "OFF" pixels may transmit the light such that it is blocked by the back polarizer. The image bearing light may then be directed through the projection lens 46 for viewing. A variety of LCD panels are commercially available employing different polarization schemes that could be employed in the present invention.

In an embodiment where the light valve 44 is a LCOS display, a liquid crystal layer on top of a mirrored substrate layer may modulate the light such that it is either reflected from the mirrored layer or blocked by polarization filters in a manner similar to the LCD display. Specific embodiments of the invention may include general modifications of the optical architecture to adjust for a particular type of light valve 44.

Figure 2:
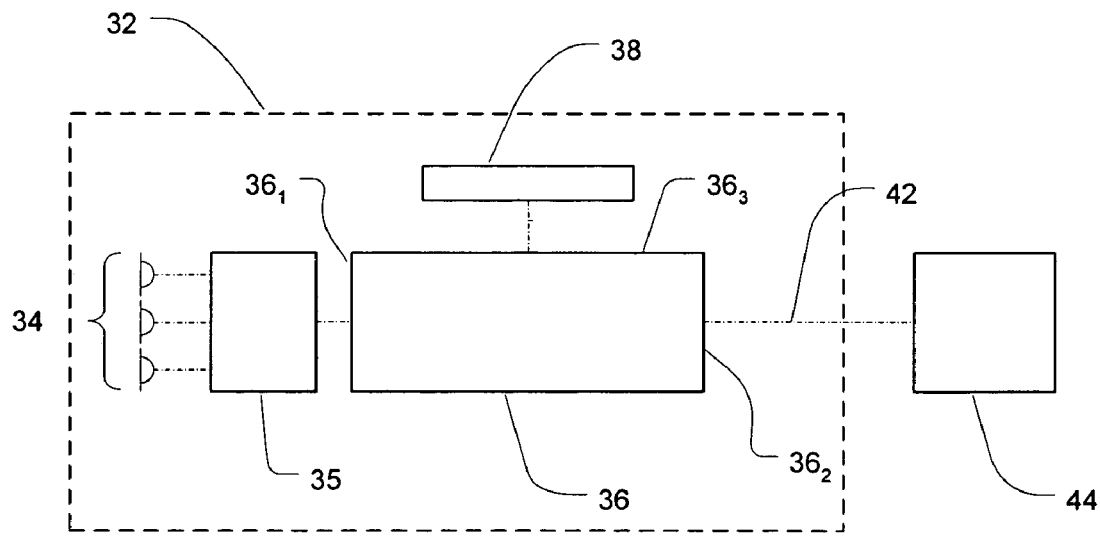
FIG. 2 illustrates light from a plurality of light sources being introduced into an integrating tunnel through an optical assembly with light from at least one other light source being introduced into the integration tunnel through a side, in accordance with an embodiment of the present invention.

FIG. 2 illustrates an illumination arrangement 32 suitable for use in the projection system 30 described in FIG. 1, in accordance with an embodiment of the present invention. Generally, FIG. 2 illustrates light from light sources 34 having wavelengths within a first range of wavelengths, corresponding to a first color, being introduced into an input aperture $36_1$ of an integrating tunnel 36 through an optical assembly 35. One or more different-colored light sources 38 may emit light having wavelengths within other ranges of wavelengths, corresponding to colors other than the first color. Light from the one or more different-colored light sources 38 may be introduced into the integrating tunnel 36 through a side surface $36_3$ of the integrating tunnel 36. The output aperture $36_2$ of the integrating tunnel 36 may output integrated light of the different colors along a light path 42 such that they illuminate the light valve 44. In an embodiment using frame sequential color each colored light may be emitted during its own emission time frame. Therefore, at any given time the integrating tunnel 36 may only have light of one particular color.

While in the foregoing description, for ease of understanding, surface $36_3$ is referred to as the side surface. Surface $36_3$ may also be referred to as top or bottom surface, as the qualification of the location of the surface is merely a function of the point of view from where integrating tunnel is described. Accordingly, the reference should not be read as limiting on the invention, and in the context of the location of the surface of the integrating tunnel, the term's "top surface", "bottom surface" and "side surface" are synonymous.

Combining all of the light paths into a single light path 42 may at least facilitate the conservation of étendue of a projection system. For example, each optical component of the projection system may have its own étendue, which refers to the size of the light collection cone that the component may process. A component's étendue is a function of its area, normal to the direction of light propagation, its acceptance angle of a solid cone of light, and the refractive index of the component. By presenting light of the different colors to the components downstream of the illumination arrangement 32 along the same path 42, the étendue of those components may be conserved by filling significant amounts of the light collection cone that the component is capable of processing.

In one embodiment, the integrating tunnel 36 may be composed of a solid glass rod that relies on total internal reflection to transfer light through it and to create, at its output aperture $36_2$, a substantially uniform illumination field. The integrating tunnel 36 may include squared off flat surfaces and can also include a cladding or reflective mirrored sidewalls that may protect and/or enhance the internal reflection. An alternative embodiment may include an integrating tunnel that is hollow with reflective sidewalls having openings for the introduction of light from the one or more light sources 38, which work much the same way as the solid glass integrators.

In one embodiment, the integrating tunnel 36 may be tapered, such that the input and output apertures 36$_1$ and 36$_2$ have different cross-sectional sizes and shapes to facilitate the collection or presentation of light as desired. For example, in one embodiment the output aperture 36$_2$ of the integrating tunnel 36 may be shaped and/or angled to better image homogenized light onto an obliquely positioned downstream imaging device. For example, an asymmetrical integrating tunnel 36, including a rectangular input aperture 36$_1$ and a nonrectangular output aperture 36$_2$, may transmit a spatially uniform pattern of light along the light path 42. The uniform illumination exiting the nonrectangular output aperture 36$_2$ may be re-imaged by a relay lens (not shown) onto a reflective light valve that is situated obliquely to the light path 42. The image exiting the nonrectangular output aperture 36$_2$ can be intentionally distorted to compensate for any Keystone distortion, illumination overfill regions, and illumination drop-off regions, thereby potentially decreasing light loss while increasing brightness and brightness uniformity across the light valve 44. Different embodiments within the scope of this invention may include numerous size and shape combinations for the input and output apertures 36$_1$ and 36$_2$ of the integrating tunnel 36.

The integrating tunnel 36 may have an aspect ratio compatible with one of a number of display standards. Examples of such display standards include, but are not limited to, a 16:9 high definition television (HDTV) format, a 4:3 extended graphics array (XGA) format, and a 16:10 widescreen XGA (WXGA) format. Various embodiments may include different cross sections and associated collection/projection optics arranged to provide for distinct projection display formats as desired.

The light sources 34 and 38 may each emit light having wavelengths within a range of wavelengths corresponding to constituent colors. The constituent colors may be thought of as the individual colors that, when combined in the appropriate amounts, create an object color for an image pixel. In one embodiment, the light sources 34 and 38 may emit light having wavelengths within three primary ranges of wavelengths corresponding to blue, green, and red.

In one embodiment, it may be desirable to be able to accommodate a different number of each of the colored light sources. This may facilitate achieving a color balance that results from different lumen output levels for the different colors. In one embodiment, the color balance for a given frame may include light from each of the colors emitted in proportions such that the combination of all three colors will result in a balanced white light.

In one embodiment, a desired color balance may be achieved by having a green lumen output level of roughly 60% of the total lumens in a frame, a red lumen output level of about 30%, and a blue lumen output level of about 10%. Therefore, the number of colored light sources may be adjusted based, at least in part, on the desired lumen output levels for the respective colors. For example, in one embodiment, the plurality of light sources 34 may be comprised of six green light sources, while the one or more different colored light sources 38 may be comprised of three red light sources and one blue light source. If each light source emitted the same number of lumens, this embodiment would result in a color balance of 60% green lumens, 30% red lumens, and 10% blue lumens. In one embodiment, the different colored light sources may emit a different number of lumens per frame due, at least in part, to their respective power ratings and efficiencies. Therefore, one embodiment may also base the number of each of the colored light sources on the power ratings and efficiencies of the respective light sources.

Although the above embodiment depicts light sources 34 and 38 emitting light having wavelengths within the three primary ranges of wavelengths, other emission wavelengths, e.g., yellow and cyan, may be additionally or alternatively employed in other embodiments.

Figure 3:
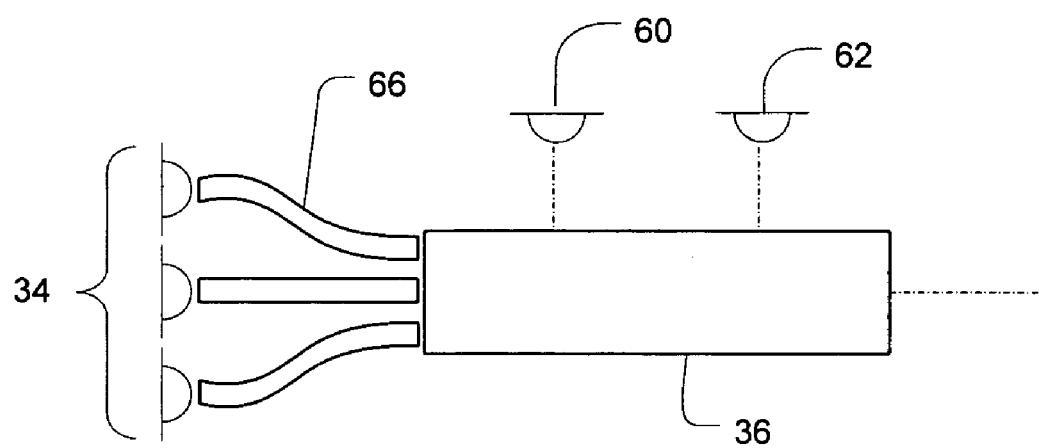
FIG. 3 illustrates an optical assembly with light transmission guides respectively associated with like-colored light sources, in accordance with an embodiment of the present invention.

FIG. 3 illustrates an optical assembly with light transmission guides 66 respectively associated with like-colored light sources 34, in accordance with an embodiment of the present invention. This embodiment includes a second and third light source 60 and 62 introducing light having wavelengths within the second and third range of wavelengths into the side of the integrating tunnel 36. In various embodiments the light sources 60 and 62 may present the light perpendicularly to the side of the integrating tunnel 36 (as illustrated) or at an angle.

The light transmission guides 66 may have input ends to receive light from the light sources at an input area and output ends to emit the light at an output area corresponding to the input aperture of the integrating tunnel 36. The light transmission guides 66 may facilitate the presentation of light from the light sources 34 to the integration tunnel 36 as optically adjacent light cones, while allowing the light sources 34 to be physically separated by some distance. This may allow for a heat dissipative arrangement of the light sources 34. In one embodiment, the light transmission guides 66 may be fibers comprised of transparent materials such as glass, fused silica, or plastic. In one embodiment the light transmission guides 66 may be coated with a material having a lower refractive index to allow for contact of the fibers, e.g., through handling or touching the mounting structures, without sacrificing total internal reflection. In one embodiment, this coating may be a fluorinated polymer cladding.

In one embodiment, the input ends of the light transmission guides 66 may extend through, and be held in place by, holes into a light source cover plate (not shown) and the light transmission guides 66 may be mated to the plurality of light sources 34 in a one-to-one relationship. The cover plate may be constructed of, for example, aluminum, magnesium, and/or other heat-dissipating materials and be coupled to a structure holding the light sources 34 in a manner to facilitate the flow of a cooling airflow.

Figure 4:
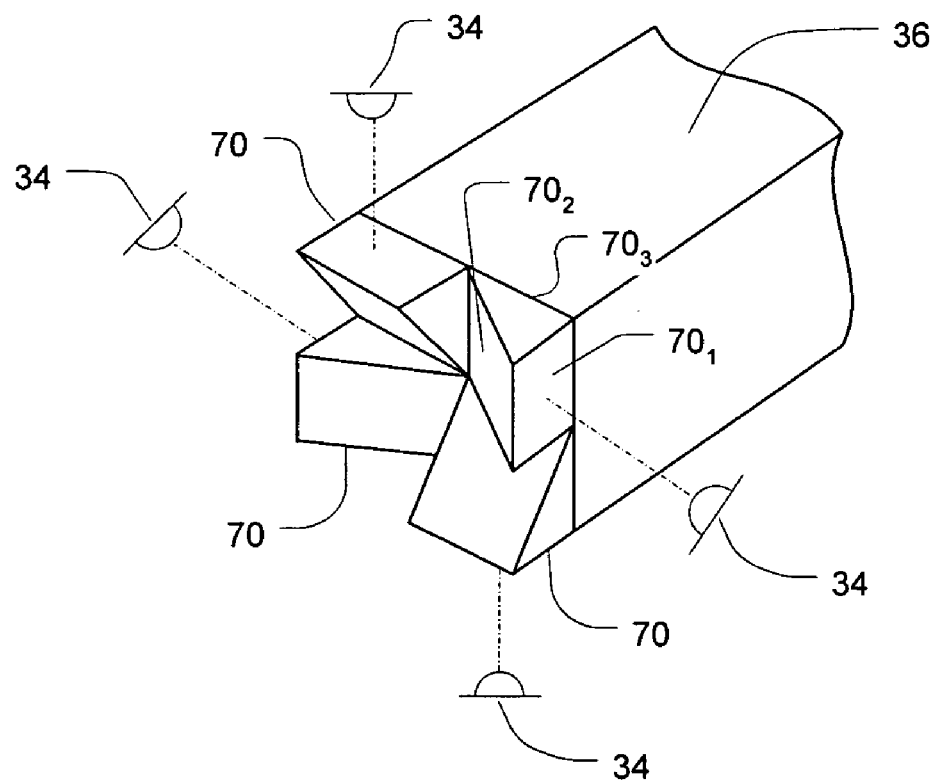
FIG. 4 illustrates an optical assembly with injection prisms respectively associated with light sources, in accordance with an embodiment of the present invention.

FIG. 4 illustrates an optical assembly with injection prisms 70 respectively associated with like-colored light sources 34, in accordance with an embodiment of the present invention. The injection prisms 70 may be optically coupled to both the light sources 34 and the integrating tunnel 36 to facilitate light transfer between the two components. The light sources 34 may be peripherally located around the injection prisms 70, as shown. This configuration may assist in the dissipation of heat produced by the light sources 34 while presenting a compact solution. In one embodiment, light transmission guides (such as the light transmission guides 66 of FIG. 3) may be placed between the injection prisms 70 and the light sources 34.

In one embodiment, the injection prisms may be total internal reflection (TIR) prisms, such that light from the light sources 34 enters an input surface 70$_1$, is internally reflected off of a reflectance surface 70$_2$, and is input into the integrating tunnel 36 through an output surface 70$_3$. The injection prisms 70 may be designed such that light hits the reflectance surface 70$_2$ at an angle less than a critical angle relative to the normal of the reflectance surface 70$_2$. In one embodiment, the reflectance surface $70_2$ may be at a 45° angle relative to the input aperture of the integrating tunnel 36. In one embodiment the injection prisms 70 may have a coating applied to the reflectance surface $70_2$ to assist in the reflection.

In one embodiment the output surface $70_3$ of the injection prisms may be coupled to the integrating tunnel 36 by a transparent adhesive, e.g., one embodiment may use an ultraviolet cured adhesive. In an alternative embodiment, there may be an air gap between the integrating tunnel 36 and the injection prisms 70.

Figure 5:
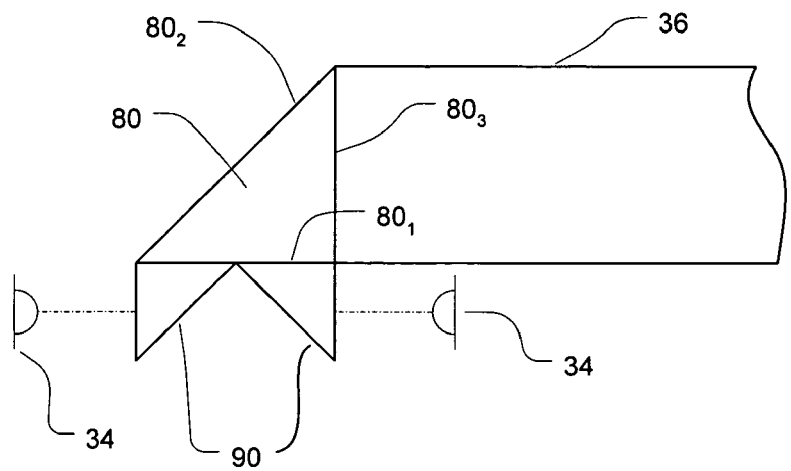
FIG. 5 illustrates an optical assembly with one injection prism and other prisms respectively associated with the light sources, in accordance with an embodiment of the present invention.

FIG. 5 illustrates an optical assembly having an injection prism 80 and input prisms 90 respectively associated with like-colored light sources 34, in accordance with an embodiment of the present invention. The input prisms 90 may be optically coupled to an input surface $80_1$ of an injection prism 80, in order to introduce light from the light sources 34 to the injection prism 80. The light may then be reflected off of a reflectance surface $80_2$ towards an output surface $80_3$, which will introduce the light into an integrating tunnel 36. The injection prism 80 may be structurally similar to the plurality of injection prisms 70 discussed above with respect to FIG. 4.

In one embodiment the faces of the integrating tunnel 36, the injection prism 80, and the plurality of input prisms 90, may be directly coupled to one another, via a transparent adhesive. In an alternative embodiment, one or more of the elements may be positioned apart from one another, such that there is an air gap in between one or more of the elements.

Figure 6:
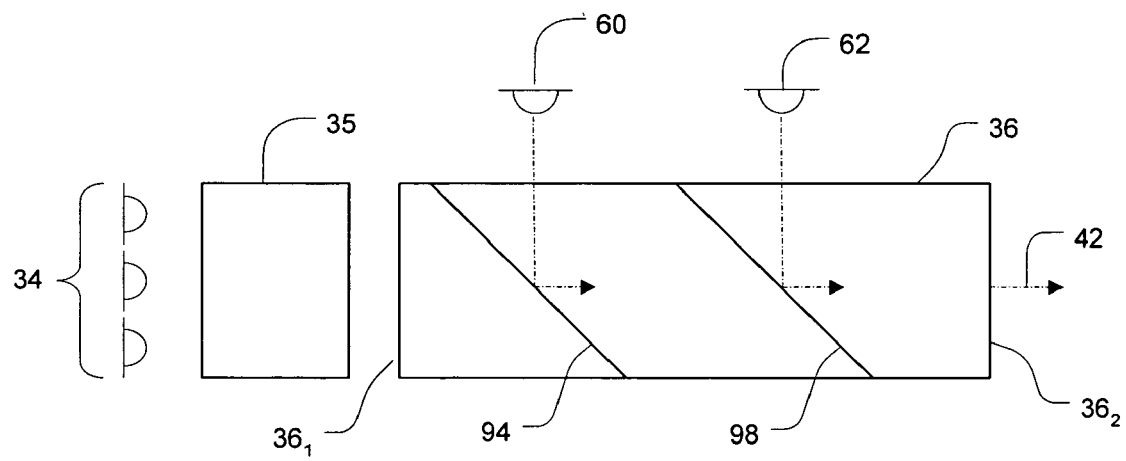
FIG. 6 illustrates two dichroic mirrors situated in an integrating tunnel to direct colored light towards an output aperture of the integrating tunnel, in accordance with an embodiment of the present invention.

FIG. 6 illustrates an integrating tunnel 36 having two dichroic mirrors 94 and 98 to direct different colored light towards an output aperture $36_2$, in accordance with an embodiment of the present invention. In this embodiment, the light sources 34 may emit light having wavelengths within a first wavelength range, corresponding to a first color, e.g., green. The green light may be directed into an optical assembly 35 which may present the green light into the integrating tunnel 36 through an input aperture $36_1$. The light source 60 may emit light having a wavelength within a second range of wavelengths, corresponding to a second color, e.g., red, into a side of the integrating tunnel 36. In this embodiment, the dichroic mirror 94 may allow at least a portion of the green light to pass, while reflecting at least a portion of red light towards an output aperture of the integrating tunnel $36_2$ and out along a light path 42. The light source 62 may emit light having a wavelength within a third range of wavelengths, corresponding to a third color, e.g., blue, into the side of the integrating tunnel 36. In this embodiment, the dichroic mirror 98 may reflect at least a portion of the blue light, while transmitting at least a portion of the red and green light. The arrangement and selection of the particular colors of this embodiment is illustrative only and may be changed in other embodiments within the scope of the present invention.

In one embodiment, the dichroic mirrors 94 and 98 may comprise edge filters that allow a particular band of frequencies to pass, while reflecting other frequencies. However, alternative embodiments could include any type of dichroic mirrors capable of transmitting light of certain wavelengths while reflecting light of other wavelengths. Examples of other dichroic mirrors could include, but are not limited to, notch filters and bandpass filters.

The design of modern dichroic mirrors may result in the transmission of some of the light that was intended to be reflected, and the reflection of some of the light that was intended to be transmitted. If the incident light illuminates a dichroic mirror at a desired angle it may result in a decrease in this type of inadvertent transmission/reflection. Therefore, in one embodiment, the light sources 60 and 62 may present the light to the dichroic mirrors 94 and 98 at angles approaching and including the desired angle to facilitate the desired transmission/reflection effect of the dichroic mirrors 94 and 98. Various embodiments may account for inadvertent transmission and/or reflection in other ways.

Figure 7:
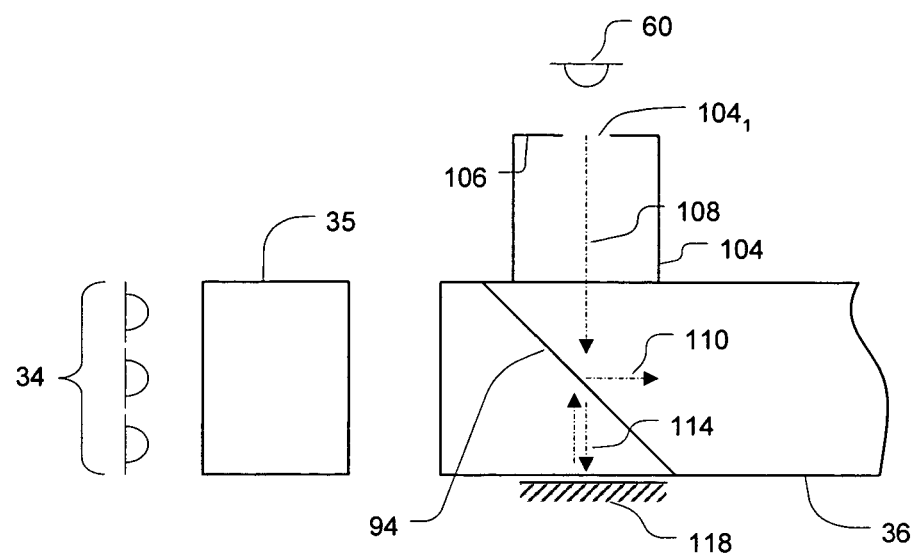
FIG. 7 illustrates an auxiliary integrating tunnel used to recycle a portion of the colored light that was inadvertently transmitted through a dichroic mirror, in accordance with an embodiment of the present invention.

FIG. 7 illustrates an auxiliary integrating tunnel 104 that may be used to recycle a portion of colored light inadvertently transmitted through a dichroic mirror 94, in accordance with an embodiment of the present invention. In this embodiment, light emitted from the light source 60 may be transmitted into an input aperture $104_1$ of the auxiliary integrating tunnel 104. The input aperture $104_1$ may be surrounded by a reflective surface 106 on or near the face of the auxiliary integrating tunnel 104. The light 108 may be introduced into the primary integrating tunnel 36 and may illuminate the dichroic mirror 94. A portion of the light 110 may be reflected toward the output of the primary integrating tunnel 36. However, a portion of light 114 may be inadvertently transmitted through the dichroic mirror 94. In one embodiment, the dichroic mirror 94 may be more effective at reflecting light of a particular polarization, e.g., S-polarized light. Resultantly, the portion of light 114 may be primarily P-polarized. A reflective surface 118, e.g., a mirror, may be placed on the opposite side of the primary integrating tunnel 36 to reflect the inadvertently transmitted light 114, back towards the light source 60.

Some of the light reflected from the reflective surface 118 may reenter the auxiliary integrating tunnel 104, strike the reflective surface 106, and be redirected back into the primary integrating tunnel 36. In one embodiment, P-polarized light may re-enter the auxiliary integrating tunnel 104 and be scrambled to include other polarization states through the series of reflections through the auxiliary integrating tunnel 104. One embodiment, may also include a quarter-wave plate (not shown) placed somewhere at or between the reflective surface 106 and the dichroic mirror 94 to assist in the rotation of the polarization states. The light may illuminate the face of the dichroic mirror 94 for a second time at a different location, with a different angle, and/or with other polarization states, which may increase the chances that at least a portion of it will be properly reflected towards the output aperture of the integrating tunnel 36.

Figure 8:
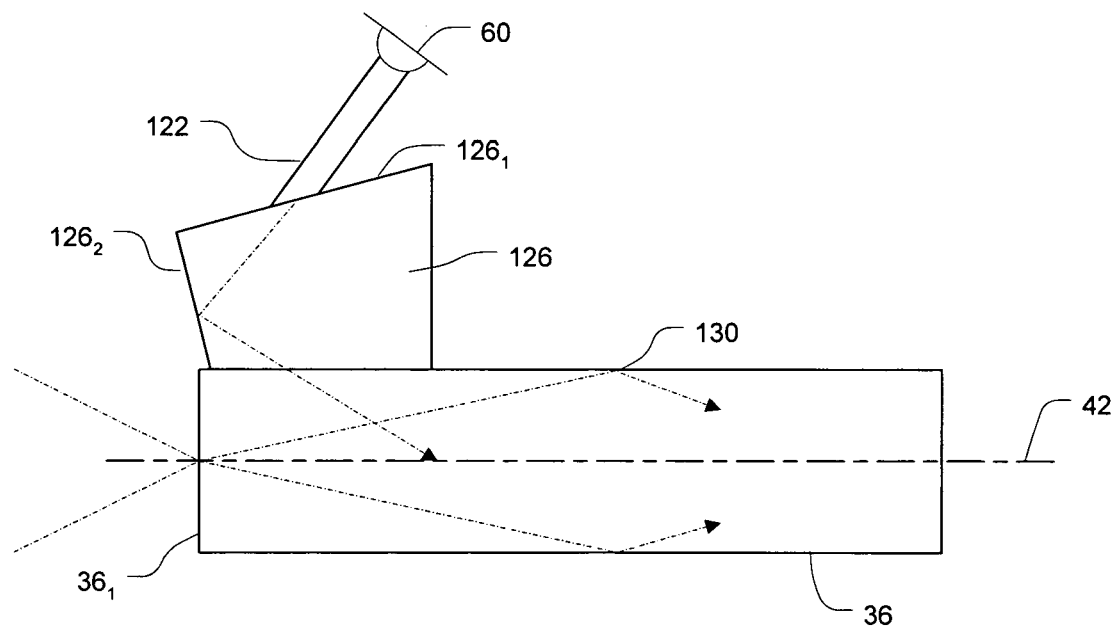
FIG. 8 illustrates a prism used to facilitate the introduction of colored light from the light source into the integration tunnel.

FIG. 8 illustrates an optical coupling device used to facilitate the introduction of colored light from a light source 60 into an integration tunnel 36, in accordance with an embodiment of the present invention. Light emitted by the light source 60 and transmitted through an optional light transmission guide 122 may be directed into the integrating tunnel 36 by an optical coupling device. In various embodiments, optical coupling devices may include, but are not limited to, prisms, glass rods, and mirrors. In the depicted embodiment, the optical coupling device may be a prism 126. The prism 126 may be attached to the light transmission guide 122 using an optically transparent adhesive. The coupling of the prism 126 to the light transmission guide 122 may be such that the light directed through the light transmission guide 122 reflects off a reflection surface $126_2$ of the prism and is introduced into the integrating tunnel 36. The light may then experience a series of reflections throughout the length of the integrating tunnel 36. As shown, the prism 126 may have an input prism face 126, that is angularly inclined relative to the side of the integrating tunnel 36 to facilitate the introduction of light and the positioning of the light source 60. However, alternative embodiments may include a prism with a parallel input face. The prism may be of any size or shape suitable for the image projection system. In one embodiment, the optical coupling device may not be used, in which case the light may be injected into the integrating tunnel 36 directly from the light source 60 or from a light transmission guide 122. In another embodiment, light from the light source 60 may be introduced to the optical coupling device without the use of a light transmission guide.

In one embodiment, contact between the prism 126 and side of the integrating tunnel 36 may occur at a location before the first paraxial reflection 130. This may reduce the loss of light entering the integrating tunnel 36 through the input aperture $36_1$ because little light is incident on the side surfaces of the integrating tunnel 36 close to that end $36_1$.

Alternative embodiments may include other types of prisms to introduce light into the side of the integrating tunnel 36. In one embodiment, a prism may be arranged such that there is an air gap between the side of the integrating tunnel and the prism. Without the direct contact between the refractive materials of the prism and the integrating tunnel 36, the internal reflection within the integrating tunnel may be unaffected.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   a plurality of first light sources to emit light having wavelengths within a first range of wavelengths corresponding to a first color;
   a second light source to emit light having a wavelength within a second range of wavelengths corresponding to a second color;
   an optical assembly to receive light from the plurality of first light sources and to transmit the light to an integrating tunnel;
   the integrating tunnel having
      a first surface to receive the light from the second light source at a first location;
      an input aperture, on a second surface adjacent to the first surface, to receive the light from the optical assembly; and
      an output aperture, to output light of the first and second color.

2. The apparatus of claim 1, wherein the light sources comprise solid state light sources.

3. The apparatus of claim 2, wherein the solid state light sources comprise at least one of a group consisting of a light-emitting diode and a laser diode.

4. The apparatus of claim 1, further comprising:
   a third light source to emit light having a wavelength within a third range of wavelengths corresponding to a third color; and
   the integrating tunnel to receive the light from the third light source at a second location, and the output aperture of the integrating tunnel to output light of the first, second, and third colors.

5. The apparatus of claim 4, wherein the first, second, and third colors comprise green, red, and blue, respectively.

6. The apparatus of claim 4, wherein the second location is on the first surface.

7. The apparatus of claim 1, wherein the optical assembly comprises a plurality of light transmission guides respectively associated with the plurality of first light sources.

8. The apparatus of claim 1, wherein the optical assembly comprises a plurality of prisms respectively associated with the plurality of first light sources.

9. The apparatus of claim 8, wherein the plurality of prisms comprise a plurality of injection prisms, each having
   an input surface to receive light from a respective one of the plurality of first light sources;
   an output surface to transmit light into the input aperture of the integrating tunnel; and
   a reflectance surface to reflect the light from the input surface toward the output surface.

10. The apparatus of claim 8, further comprising:
    an injection prism having
       an input surface, optically coupled to the plurality of prisms;
       an output surface, optically coupled to the input aperture of the integrating tunnel; and
       a reflectance surface to reflect light from the input surface towards the output surface; and
    the plurality of prisms to receive light from the respective plurality of first light sources and to transmit the light into the input surface of the injection prism, the injection prism to transmit the light into the integrating tunnel.

11. The apparatus of claim 1, further comprising:
    a first dichroic mirror, disposed within the integrating tunnel,
       to transmit at least a portion of the light of the first color towards the output aperture of the integrating tunnel; and
       to reflect at least a portion of the light of the second color towards the output aperture of the integrating tunnel.

12. The apparatus of claim 11, wherein the integrating tunnel is a primary integrating tunnel and the apparatus further comprising:
    an auxiliary integrating tunnel optically coupled to the primary integrating tunnel at the first location, the auxiliary integrating tunnel having
       an input aperture, an output aperture, and a first reflective surface surrounding the input aperture,
       the auxiliary integrating tunnel to receive light of the second color through the input aperture and to transmit the light out of the output aperture towards the first location of the primary integrating tunnel, and
    a second reflective surface on or near a third surface of the primary integrating tunnel opposite the first surface, to receive a portion of light of the second color transmitted through the first dichroic mirror and to reflect it back towards the first reflective surface of the auxiliary integrating tunnel.

13. The apparatus of claim 11, further comprising:
    a third light source to emit light having a wavelength within a third range of wavelengths corresponding to a third color; and the integrating tunnel having a second location to receive light from the third light source, and the output aperture of the integrating tunnel to output light of the first, second, and third colors; and a second dichroic mirror, disposed within the integrating tunnel,
to transmit, at least a portion of, the light of the first and second colors toward the output aperture of the integrating tunnel; and
to reflect, at least a portion of, the light of the third color toward the output aperture of the integrating tunnel.

14. The apparatus of claim 1, further comprising:
a prism to receive light from the first light source and to transmit the light into the integrating tunnel at the first location.

15. A method comprising:
emitting light having wavelengths within a first range of wavelengths corresponding to a first color, from a plurality of first light sources into an input aperture of an integrating tunnel; and
emitting light having a wavelength within a second range of wavelengths corresponding to a second color, from a second light source, into a first surface of the integrating tunnel at a first location, the first surface being adjacent to a second surface that includes the input aperture.

16. The method of claim 15, further comprising:
emitting light having a wavelength within a third range of wavelengths corresponding to a third color, from a third light source, into the integrating tunnel through a second location.

17. The method of claim 16, wherein light of each of the first, second, and third colors is emitted from a respective number of respective light sources.

18. The method of claim 17, wherein light of each of the first, second, and third colors have respective lumen output levels.

19. The method of claim 18, wherein the light of the first color is emitted such that it has a lumen output level greater than the lumen output levels of light of both the second and the third colors.

20. The method of claim 19, wherein the light of the second color is emitted such that it has a lumen output level greater than the lumen output level of light of the third color.

21. The method of claim 20, wherein the first, second and third colors comprise green, red, and blue, respectively.

22. The method of claim 18, wherein the respective number of respective light sources is based, at least in part, on the lumen output levels of the respective colors.

23. The method of claim 15, further comprising
transmitting at least a portion of the light of the first color through a dichroic mirror located in the integrating tunnel, towards an output aperture of the integrating tunnel; and
reflecting at least a portion of the light of the second color with the first dichroic mirror towards the output aperture.

24. The method of claim 15, wherein emitting light from the plurality of first light sources into the input aperture of the integrating tunnel comprises introducing the light to the input aperture through at least one of a group consisting of light transmission guides and prisms.

25. The method of claim 15, wherein the light sources comprise at least one of a group consisting of a light-emitting diode and a laser diode.

26. A method comprising:
emitting light within a first range of wavelengths corresponding to a first color from a first number of first light sources;
emitting light within a second range of wavelengths corresponding to a second color from a second number of second light sources;
emitting light within a third range of wavelengths corresponding to a third color from a third number of third light sources;
light of each of the first, second, and third colors having respective lumen output levels;
the first, second, and third numbers being based, at least in part, on the lumen output levels of the respective colors; and
integrating light of each of the first, second, and third colors in an integrating tunnel.

27. The method of claim 26, further comprising:
each of the first, second, and third light sources having respective power ratings and efficiencies; and
the first, second, and third numbers being based, at least in part, on the respective power ratings and efficiencies.

28. A system comprising:
an illumination arrangement including
a plurality of first light sources to emit light having wavelengths within a first range of wavelengths corresponding to a first color;
a second light source to emit light having a wavelength within a second range of wavelengths corresponding to a second color;
a third light source to emit light having a wavelength within a third range of wavelengths corresponding to a third color; and
an integrating tunnel having a first surface to receive the light from the second light source at a first location, an input aperture, on a second surface adjacent to the first surface, to receive the light from the plurality of first light sources, a second location to receive light from the third light source, and an output aperture, to output light of the first, second, and third colors; and
an imaging device to receive the light from the illumination arrangement, and to modulate the light into image bearing light.

29. The system of claim 28, wherein the light sources comprise at least one of a group consisting of a light-emitting diode and a laser diode.

30. The system of claim 28, wherein the imaging device comprises one of a group consisting of a digital micromirror device, a liquid crystal on silicon device, and a liquid crystal display.

31. The system of claim 28, further comprising:
a projection lens, to receive the image bearing light from the imaging device, and to project an image.

32. The system of claim 28, further comprising:
a controller adapted to receive color image data from a data source and to send control signals to the image device based on the color image data; and
the imaging device to receive the control signals and to modulate the light into image bearing light based, at least in part, on the control signals.

33. The system of claim 32, in which the data source comprises one of a personal computer, a set-top box, and an integrated television tuner.

* * * * *